(12) United States Patent
Touhey et al.

(10) Patent No.: US 6,287,225 B1
(45) Date of Patent: Sep. 11, 2001

(54) SELF CONTAINED SPORT BALL INFLATION MECHANISM

(75) Inventors: Daniel P. Touhey, Lee, MA (US); Brian P. Feeney, East Windsor, CT (US); Joseph E. Stahl, Southampton, MA (US); Neil T. Amundsen, Minneapolis; Louis F. Polk, III, Excelsior, both of MN (US); Joseph J. Schachtner, Deer Park, WI (US); Kenneth V. Schomburg, Wayzata; George D. Stickler, Shorewood, both of MN (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

(21) Appl. No.: 09/478,225

(22) Filed: Jan. 6, 2000

Related U.S. Application Data
(60) Provisional application No. 60/159,311, filed on Oct. 14, 1999.

(51) Int. Cl.[7] .................................................. A63B 37/00
(52) U.S. Cl. ............................................................ 473/593
(58) Field of Search .................................. 473/593, 610, 473/611; 446/220, 224; 417/478, 479, 480, 259; 36/29

(56) References Cited

U.S. PATENT DOCUMENTS

| | | | | |
|---|---|---|---|---|
| 602,294 | * | 4/1898 | Arnold | 473/593 |
| 3,119,617 | * | 1/1964 | Topper | 473/593 |
| 4,975,028 | * | 12/1990 | Schultz | 417/553 |
| 5,098,095 | * | 3/1992 | Weiss | 473/593 |
| 5,238,244 | * | 8/1993 | Cotter et al. | 473/593 |
| 5,494,410 | * | 2/1996 | Maier-Laxhuber et al. | 417/259 |

* cited by examiner

*Primary Examiner*—Steven Wong

(57) ABSTRACT

An inflatable sport ball, such as a basketball, a football, a soccer ball, a volley ball or a playground ball, is provided with a self-contained inflation mechanism for inflating or more likely adding pressure to the ball. The mechanism is a pump which is inside of the ball and which is operable from outside of the ball to pump ambient air into the ball.

13 Claims, 6 Drawing Sheets

US 6,287,225 B1

SELF CONTAINED SPORT BALL INFLATION MECHANISM

This application claims the benefit of U.S. Provisional Application No. 60/159,311, filed Oct. 14, 1999.

BACKGROUND OF THE INVENTION

The present invention relates to sport balls which contain mechanisms for inflating or adding pressure to the balls.

Conventional inflatable sport balls, such as basketballs, footballs, soccer balls, volley balls and playground balls, are inflated through a traditional inflation valve using a separate inflation needle that is inserted into and through a self-sealing inflation valve. A separate pump, such as a traditional bicycle pump, is connected to the inflation needle and the ball is inflated using the pump. The inflation needle is then withdrawn from the inflation valve which self-seals to maintain the pressure. This system works fine until the sport ball needs inflation or a pressure increase and a needle and/or pump are not readily available.

SUMMARY OF THE INVENTION

The present invention provides a sport ball which has a self-contained inflation mechanism. The object is to be able to inflate or add pressure to a sport ball without the need for separate inflation equipment such as a separate inflation needle and pump. Specifically, the invention relates to a sport ball which has a self-contained pump device which is operable from outside the ball and which pumps ambient air into the ball to achieve the desired pressure. More specifically, the pump device provides a chamber within the ball with means for admitting ambient air into the chamber and provides means for forcing that air from the chamber through one-way valve means into the interior volume of the ball. The pump device most specifically comprises a piston and cylinder arrangement with the piston operable from outside the ball.

DESCRIPTION OF THE PREFERRED EMBODIMENTS

Figure 1:
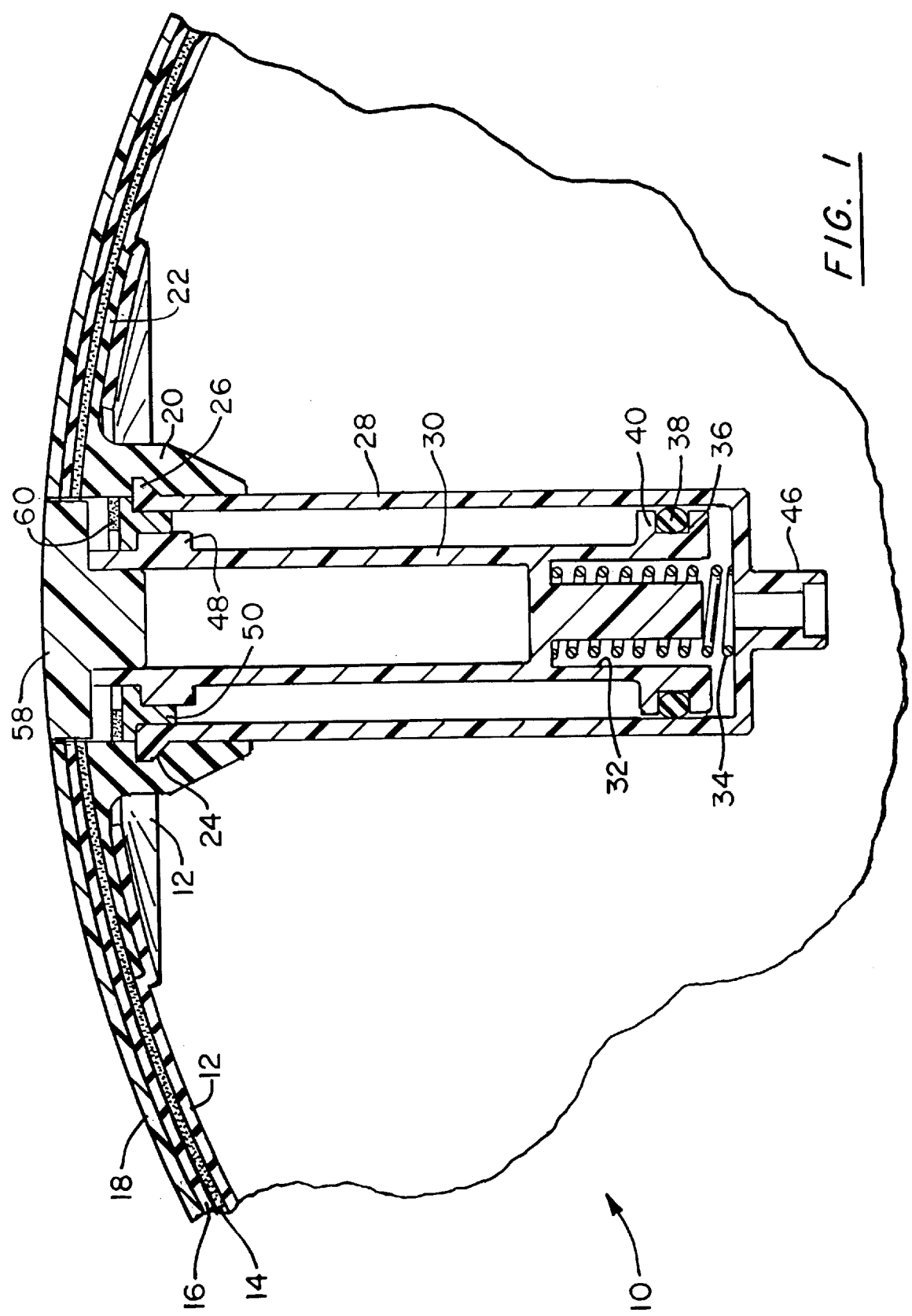
FIG. 1 shows a cross section of a portion of a sport ball with a self-contained piston and cylinder arrangement operable from outside the ball for adding air pressure to the ball.

Referring first to FIGS. 1 to 5 of the drawings, a portion of a sport ball 10 is illustrated incorporating one embodiment of an inflation pump of the invention. The ball which is illustrated is a typical basketball construction comprising a carcass having a rubber bladder 12 for air retention, a layer 14 composed of layers of nylon or polyester yarn windings wrapped around the bladder and an outer rubber layer 16. For a laminated ball, an additional outer layer 18 of leather or a synthetic comprises panels which are applied by adhesive and set by cold molding. The windings are randomly oriented and two or three layers thick and they form a layer which cannot be extended to any significant degree and which restricts the ball from expanding to any significant extent above its regulation size when inflated above its normal playing pressure. This layer for footballs, volleyballs and soccer balls is referred to as a lining layer and is usually composed of cotton or polyester cloth that is impregnated with a flexible binder resin such as vinyl or latex rubber.

Incorporated into the carcass of the ball of the invention during the formation is the rubber pump boot or housing 20 with a central opening and with a flange 22 which is bonded to the bladder using a rubber adhesive. The boot is located between the rubber bladder 12 and the layer of windings 14. An aluminum molding plug is inserted into the boot opening during the molding and winding process to maintain the proper shape central opening and to allow the bladder to be inflated during the manufacturing process. The central opening through the boot 20 is configured with a groove 24 to hold the flange 26 on the upper end of the pump cylinder 28. The cylinder can optionally be bonded to the boot using any suitable flexible adhesive (epoxy, urethane or other).

Figure 2:
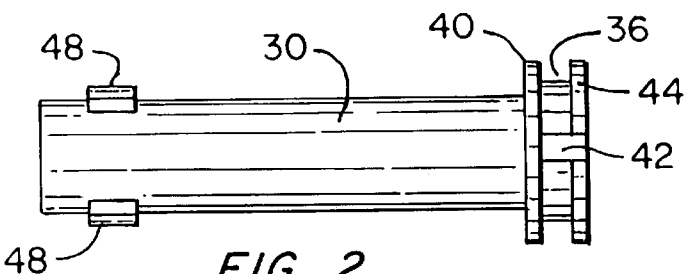
FIG. 2 is a side view of the piston shown in FIG. 1.

Located in the pump cylinder 28 is the pump piston 30 which is illustrated in both FIGS. 1 and 2. The piston includes a circular groove 32 at the bottom end which contains the spring 34 that forces the piston up in the cylinder 28. Also at the bottom end of the piston 30 is an O-ring groove 36 containing the O-ring 38. As seen in FIG. 1, this O-ring groove 36 is dimensioned such that the O-ring 38 can move up and down in the groove 36. The O-ring is forced into the position shown in FIG. 1 when the piston 30 is pushed down. In this position, the O-ring seals between the cylinder wall and the upper flange 40 of the groove 36. As shown in FIG. 2, there are recesses or slots 42 in the groove 36 extending from just below the upper flange 40 down through the lower flange 44. Only one of these slots 42 is shown in FIG. 2 but there are preferably two or more. When the piston 30 is forced up by the spring 34, the O-ring 38 moves to the bottom of the groove 36 which opens up a by-pass around the O-ring through the recesses 42 so that the air can enter the cylinder 28 below the piston 30. Then, when the piston is pushed down, the O-ring moves back up to the top of the groove and seals to force the air out through the cylinder exit nozzle 46.

Figure 3:
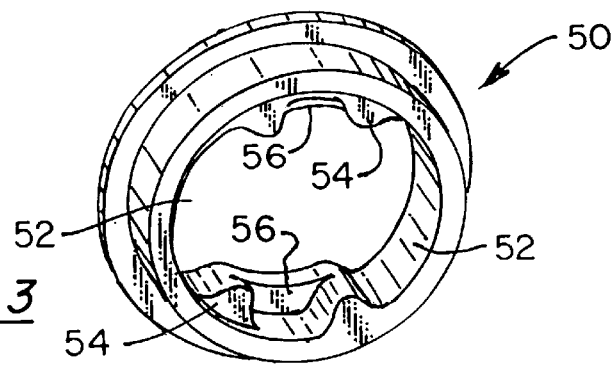
FIG. 3 is an isometric view of the cap for the pump of FIG. 1 showing the configuration for locking and unlocking the pump piston.

At the upper end of the piston are the two flanges 48 which cooperate with the cylinder cap 50 to hold the piston down in the cylinder and to release the piston for pumping. The cylinder cap 50 is fixed into the top of the cylinder 28 and the piston 30 extends through the center of the cylinder cap. The cap is cemented into the cylinder. FIG. 3 shows an isometric view of the bottom of the cylinder cap 50 and illustrates the open areas 52 on opposite sides of the central opening through which the two flanges 48 on the piston can pass in the unlocked position. In the locked position, the piston is pushed down and rotated such that the two flanges 48 pass under the projections 54 and are rotated into the locking recesses 56. Attached to the upper end of the piston 30 is a button or cap 58 which is designed to essentially completely fill the hole in the carcass and to be flush with the surface of the ball. This button may be of any desired material such as cast urethane or rubber. Mounted on the upper surface of the cylinder cap 50 is a pad 60 which is engaged by the button 58 when the piston is pushed down against the spring force to lock or unlock the piston. The pad provides cushioning to the pump and should also be flexible to match the feel of the rest of the ball. Its surface should be textured to increase grip.

Figure 4:
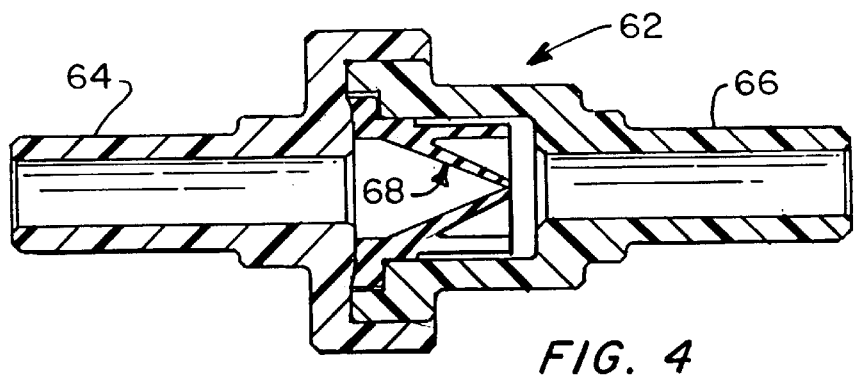
FIG. 4 is a detailed cross-section view of a one-way valve assembly for use on the exit of the pump of FIG. 1.

FIG. 1 of the drawings shows a pump exit nozzle 46 but does not show the one way valve that is attached to this exit. Shown in FIG. 4 is a one-way valve assembly 62 of the duckbill-type to be mounted in the exit nozzle 46. This assembly comprises an inlet end piece 64, an outlet end piece 66 and an elastomeric duckbill valve 68 captured between the two end pieces. The end pieces 64 and 66 are preferably plastic, such as a polycarbonate, and may be ultrasonically welded together.

Figure 5:
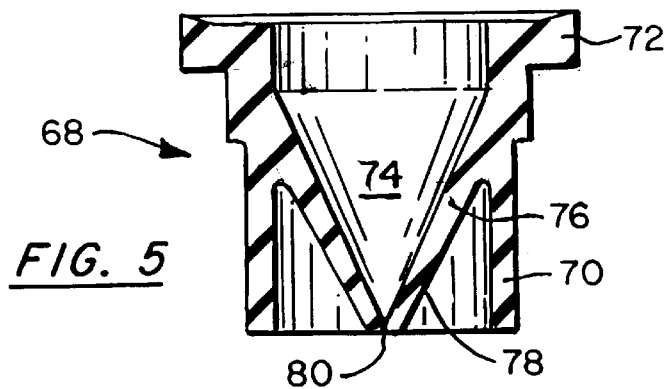
FIG. 5 is a more detailed view of the duckbill valve in the FIG. 4 assembly.

Although any desired one-way valve can be used on the exit nozzle 46 and although duckbill valves are a common type of one-way valves, a specific duckbill configuration is shown in FIG. 4 and in greater detail in FIG. 5. The duckbill structure 68 is formed of an elastomeric silicone material and is molded with a cylindrical barrel 70 having a flange 72. Inside of the barrel 70 is the duckbill 74 which has an upper inlet end 76 molded around the inside circumference into the barrel 70. The walls or sides 78 of the duckbill 74 then taper down to form the straight line lower end with the duckbill slit 80. The duckbill functions in the conventional manner where inlet air pressure forces the duckbill slit 80 open to admit air while the air pressure inside of the ball squeezes the duckbill slit closed to prevent the leakage of air. Such a duckbill structure is commercially available from Vernay Laboratories, Inc. of Yellow Springs, Ohio.

Figure 6:
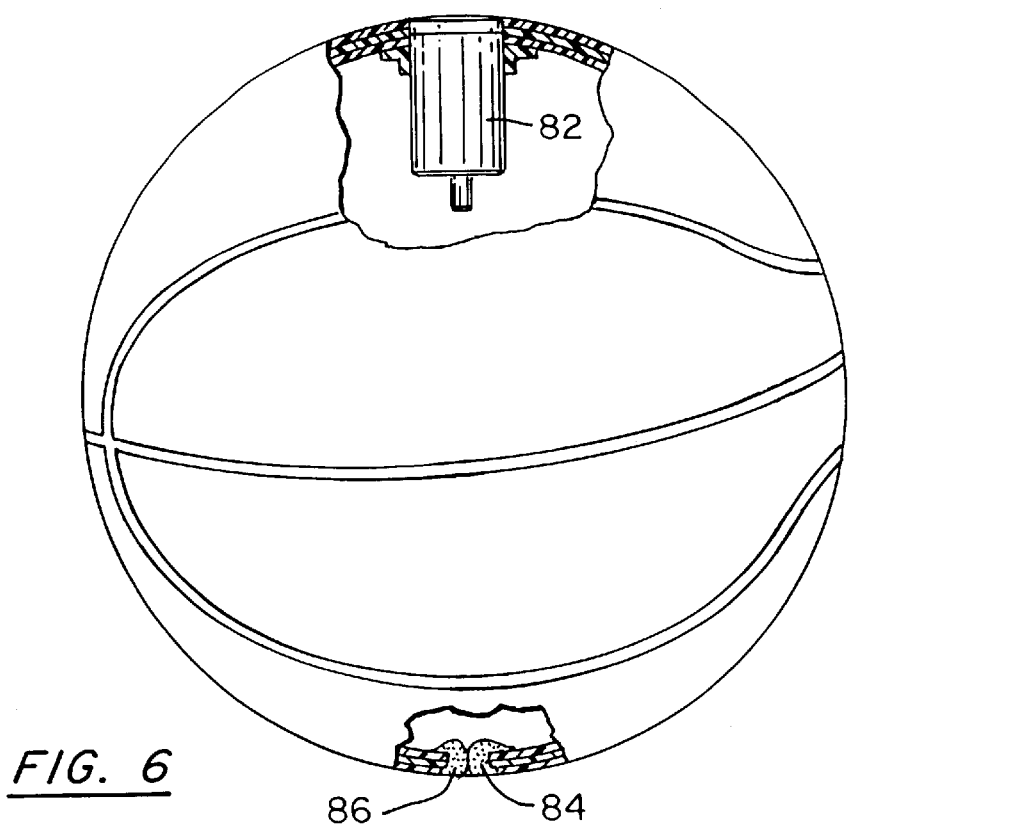
FIG. 6 is a cross-section view of an entire sport ball illustrating a pump on one side and a traditional inflation valve on the opposite side including a counterweight.

A pump assembly of the type described and illustrated in FIGS. 1 to 5 is preferably made primarily from plastics such as high impact polystyrene. Although the assembly is small and light weight, perhaps only about 25 grams, it is desirable that a weight be added to the ball structure to counterbalance the weight of the pump mechanism. FIG. 6 illustrates such an arrangement wherein a pump mechanism generally designated 82 is on one side of the ball and a standard needle valve 84 is on the opposite side of the ball. In this case, the material 86 forming the needle valve 84 is weighted. Additional material can be added to the needle valve housing or the region surrounding the valve. Alternatively, a dense metal powder such as tungsten could be added to the rubber compound.

Figure 7:
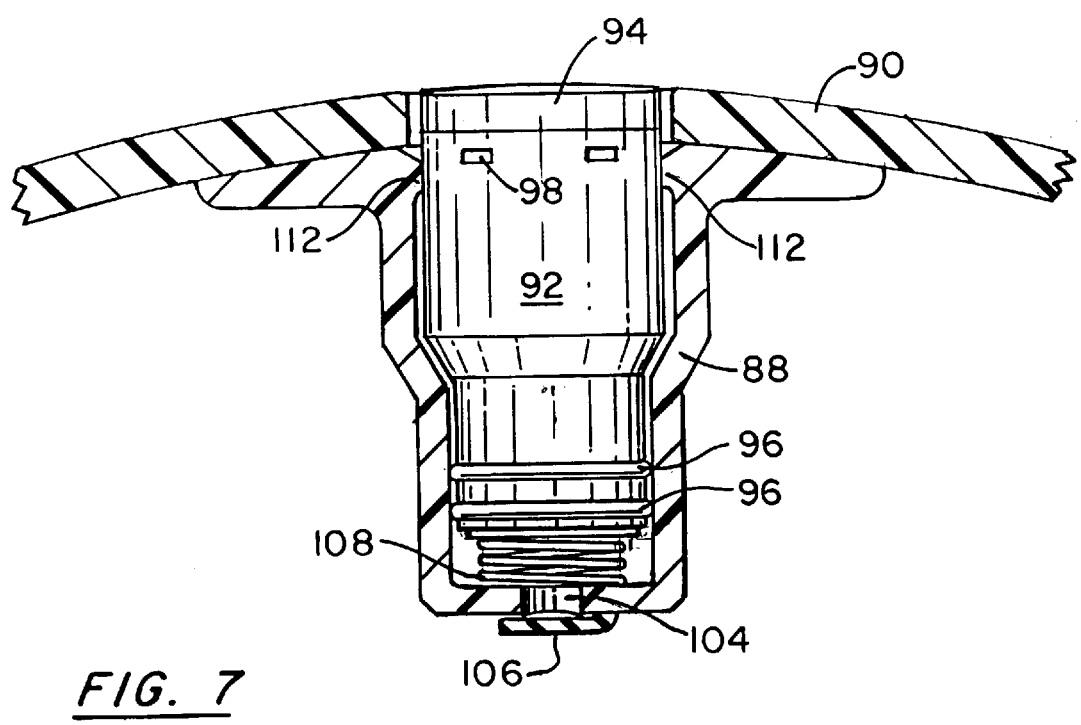
FIGS. 7, 8 and 9 illustrate another embodiment of the invention employing a different piston and cylinder arrangement.
Figure 8:
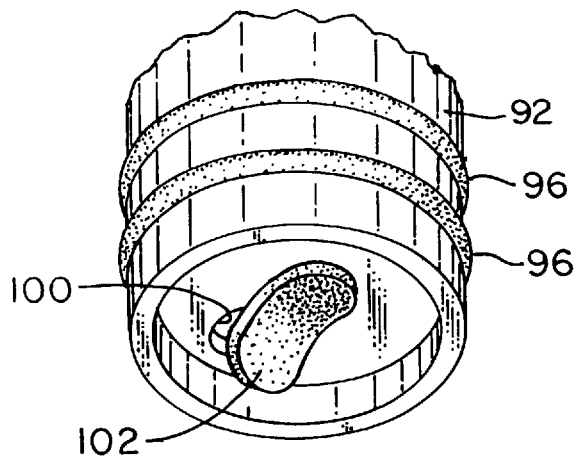
Figure 9:
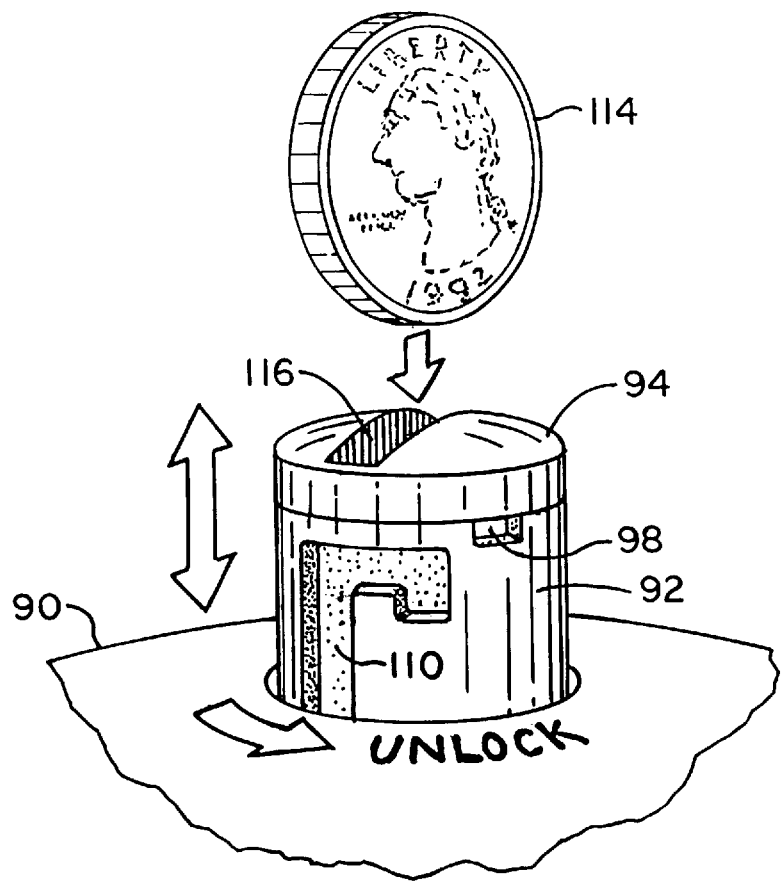

The description thus far and the drawing FIGS. 1 to 5 disclose a particular and preferred pump arrangement. However, other pump arrangements can be used within the scope of the invention. FIGS. 7, 8 and 9 illustrate another type of pump inside of the ball and operable from outside. The pump comprises a rigid cylinder 88 attached to the carcass 90 of the ball. The piston 92 is hollow with a cap 94 on the top. The O-rings 96 form the seal between the piston 92 and the cylinder 88. Adjacent the top of the piston 92 are air intake holes 98 and an air outlet hole 100 is in the bottom of the piston. A flap valve 102 covers the hole 100 such that air flows into the piston 92 and out of the outlet hole 100 through the flap valve 102 to fill the cylinder 88 with air when the piston 92 is pulled up. In the bottom of the cylinder 88 is a hole 104 and a flap valve 106. When the piston 92 is pushed back down, the flap valve 102 closes and the flap valve 106 opens and the air in the cylinder 88 is forced through the hole 104 and flap valve 106 into the ball. When the piston 92 is being pulled up, the flap valve 106 is forced closed. A spring 108 forces the piston 92 to the up or extended position and the piston is pushed down against the spring force. J-slots 110 on the piston 92 cooperate with the projections 112 on the cylinder to lock the piston in the down position. Therefore, the piston is turned to lock and unlock the piston such as by the use of a coin 114 in the slot 116.

Figure 10:
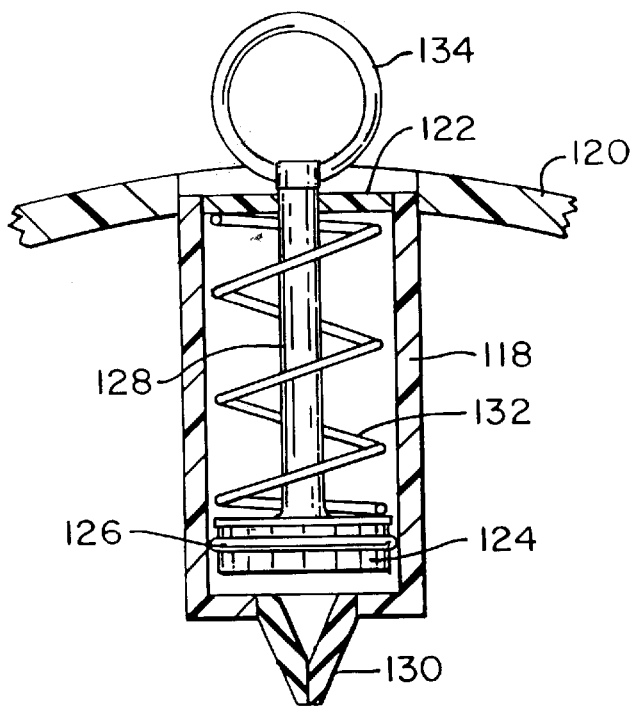
FIGS. 10 and 11 illustrate a further pump embodiment of the invention.
Figure 11:
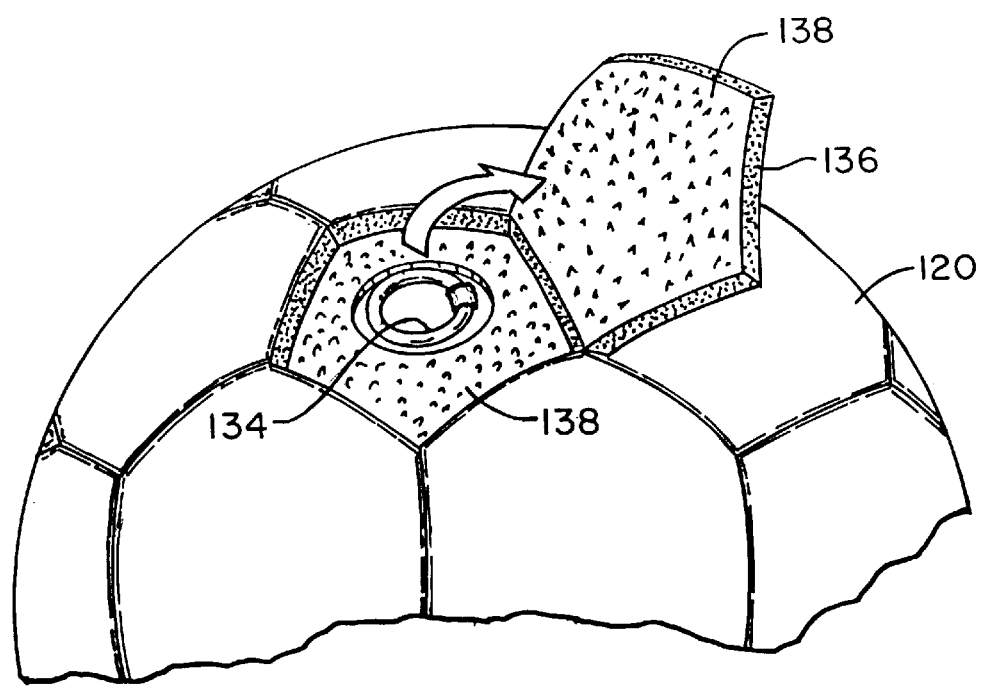

Another variation of the invention is shown in FIGS. 10 and 11. Generally shown is a cylinder 118 attached to the carcass 120 of the ball and a cap 122 on the cylinder. The actual layers of the carcass are not shown in this FIG. 10. Inside of the cylinder is a piston 124 with an O-ring seal 126 and a piston rod 128. On the bottom of the cylinder is a one-way valve 130 of the duckbill-type. In this embodiment, the spring 132 forces the piston 124 and the piston rod 128 down into the cylinder so that the piston rod 128 is pulled up against the spring force and the spring forces the piston and piston rod down into the cylinder. Attached to the upper end of the piston rod is a flip-up pull ring 134. As seen in FIG. 11, this ring 134 is flipped down and covered with a flap 136 of the ball covering which is held down by a typical hook-and-loop fabric 138 such as Velcro™.

Figure 12:
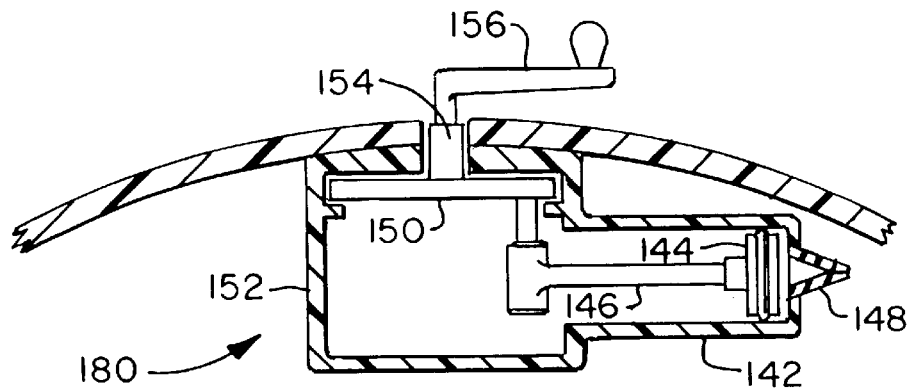
FIGS. 12 and 13 illustrate a pump embodiment which is operated by rotary motion.
Figure 13:
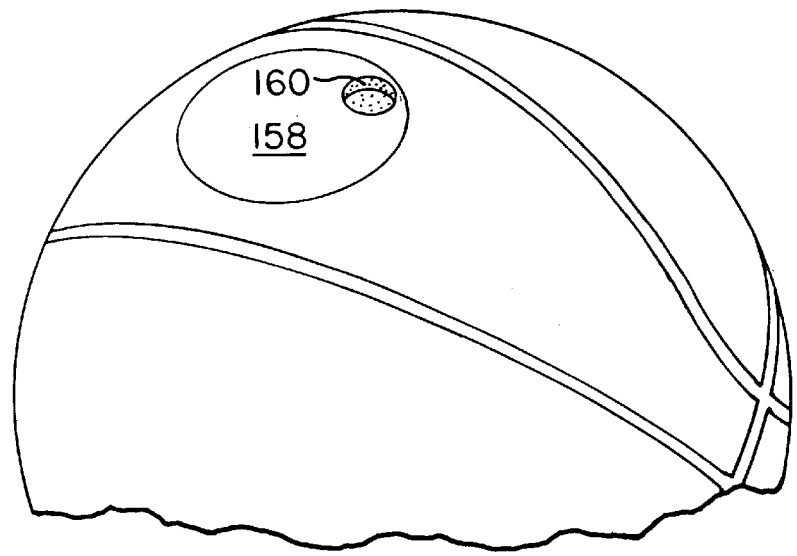

FIG. 12 illustrates another embodiment of the invention in which the pump generally designated 180 with a cylinder 142, a piston 144, a piston rod 146 and a duckbill valve 148 has the piston rod rotatably connected to the rotating disk or crank wheel 150. This disk 150 is rotatably mounted in the chamber 152 and a crank fitting 154 extends up through the carcass of the ball. The crank 156 is inserted into the fitting 154 for rotation of the disk 150 and the consequent operation of the pump. The related version of this embodiment shown in FIG. 13 has the rotating disk comparable to the disk 150, now designated 158, rotatably mounted on the surface of the ball. The disk has a finger hole 160 so that the disk can be manually rotated with a finger inserted into the hole.

Figure 14:
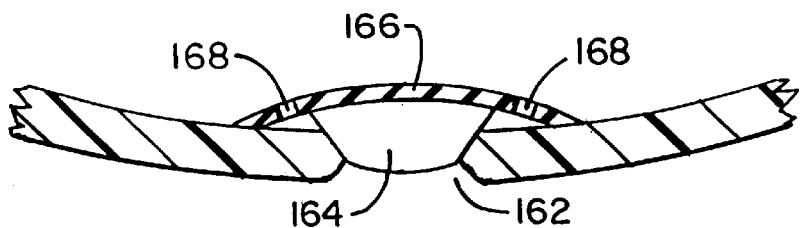
FIG. 14 illustrates one embodiment of an apparatus to bleed from the ball.

Since the pressure in a sport ball can be too high through over inflation or a temperature increase, it is advisable to have a way to bleed pressure from the ball when the conventional inflating needle is not available. Such an arrangement is shown in FIG. 14 including a bleeding aperture 162 through the carcass of the ball, a plug 164 in the aperture and an elastic cover 166 having holes 168 that normally keep the plug 164 tight and sealed in the aperture 162. The elastic cover 166 permits the plug 162 to be pushed open to bleed pressure through the holes 168 and the aperture 162.

What is claimed is:

1. An inflatable sport ball comprising a carcass and an internal pump attached to said carcass, said pump including a cylinder having an air outlet into said ball, a one-way valve attached to said air outlet permitting air flow from said cylinder into said ball and preventing air flow from said ball back into said cylinder, a piston in said cylinder operable to draw ambient air from outside said ball into said cylinder and to force said drawn ambient air from said cylinder through said one-way valve into said ball and further including means for actuating said piston from outside said carcass, wherein said means for actuating said piston comprise a piston rod attached to said piston and extending through an opening in said carcass and movable between an extended position and an inserted position and further including a spring positioned to force said piston up in said cylinder away from said air outlet and force said piston rod to said extended position outside of said ball through said opening whereby said piston rod may be actuated and including means for locking said piston rod in said inserted position.

2. An inflatable sport ball as recited in claim 1 wherein said cylinder is sealed to said carcass around said opening.

3. An inflatable sport ball comprising a carcass and an internal pump attached to said carcass, said pump including a cylinder having an air outlet into said ball, a one-way valve attached to said air outlet permitting air flow from said cylinder into said ball and preventing air flow from said ball back into said cylinder, a piston in said cylinder operable to draw ambient air from outside said ball into said cylinder and to force said drawn ambient air from said cylinder through said one-way valve into said ball and further including means for actuating said piston from outside said carcass, wherein said means for actuating said piston comprises a rotatable crank wheel and a piston rod attached between said crank wheel and said piston wherein said crank wheel is rotatable from outside said ball.

4. An inflatable sport ball as recited in claim 1 and further including means attached inside said ball to counterbalance the weight of said internal pump.

5. An inflatable sport ball as recited in claim 1 and further including means for bleeding air pressure from said ball.

6. An inflatable sport ball as recited in claim 1 wherein said sport ball is a basketball.

7. An inflatable sport ball as recited in claim 1 wherein said sport ball is a volley ball.

8. An inflatable sport ball as recited in claim 1 wherein said sport ball is a football.

9. An inflatable sport ball as recited in claim 1 wherein said sport ball is a soccer ball.

10. An inflatable sport ball as recited in claim 1 wherein said sport ball is a playground ball.

11. An inflatable sport ball as recited in claim 3 and further including means attached inside said ball to counterbalance the weight of said internal pump.

12. An inflatable sport ball as recited in claim 3 and further including means bleeding air pressure from said ball.

13. An inflatable sport ball as recited in claim 1 and further including an O-ring on said piston.

* * * * *